(12) United States Patent
Mak et al.

(10) Patent No.: US 12,705,731 B1
(45) Date of Patent: Aug. 11, 2026

(54) SYSTEM AND METHOD FOR GEMSTONE IDENTIFICATION

(71) Applicant: Chow Sang Sang Jewellery Company Limited, Hong Kong (CN)

(72) Inventors: Shuk Kwan Mak, Hong Kong (CN); Wai Chiu Lam, Hong Kong (CN); Kwok Bun Cheng, Hong Kong (CN)

(73) Assignee: CHOW SANG SANG JEWELLERY COMPANY LIMITED, Hong Kong (CN)

( * ) Notice: Subject to any disclaimer, the term of this patent is extended or adjusted under 35 U.S.C. 154(b) by 0 days.

(21) Appl. No.: 19/365,199

(22) Filed: Oct. 22, 2025

(30) Foreign Application Priority Data

Apr. 9, 2025 (HK) .......................... 32025105791.7

(51) Int. Cl.
*G06T 7/00* (2017.01)
*G06V 10/44* (2022.01)
*G06V 10/764* (2022.01)

(52) U.S. Cl.
CPC .............. *G06T 7/001* (2013.01); *G06V 10/44* (2022.01); *G06V 10/764* (2022.01); *G06T 2207/30108* (2013.01)

(58) Field of Classification Search
None
See application file for complete search history.

(56) References Cited

U.S. PATENT DOCUMENTS 8,270,719 B2 * 9/2012 Ellawand .............. G01N 21/41 356/30
11,874,231 B1 * 1/2024 Mak ...................... G06V 30/10
2010/0092067 A1 * 4/2010 Ellawand .............. G01N 21/41 382/209
2016/0232432 A1 * 8/2016 Regev ................. G06V 20/647
(Continued)

FOREIGN PATENT DOCUMENTS

CN 101726494 A 6/2010
CN 108846403 A 11/2018
CN 112116398 A 12/2020
(Continued)

*Primary Examiner* — Jiangeng Sun
(74) *Attorney, Agent, or Firm* — Law Offices of Albert Wai-Kit Chan, PLLC

(57) ABSTRACT

This invention provides a system and a computer implemented method to match gemstones with records in a gemstone database. In one embodiment, said computer implemented method comprises the steps of: a) Acquiring a source image of a gemstone; b) Receiving an input for identifying a corresponding gemstone in said gemstone database; c) Retrieving a set of reference data; d) Extracting gemstone features from said source image; e) Performing alignment of said gemstone features with said set of reference data and performing a homography transformation to map said gemstone features onto a standard plane to obtain a transformed source image from said source gemstone; f) Obtaining a transformed reference image from said set of reference data; g) Computing a similarity value by matching said transformed source image against said transformed reference image; and h) Determining whether said gemstone in question matches said corresponding gemstone based on said similarity value.

16 Claims, 7 Drawing Sheets

(56) References Cited

U.S. PATENT DOCUMENTS

| | | | | |
|---|---|---|---|---|
| 2022/0163457 | A1* | 5/2022 | Takahashi ............ | G01N 21/255 |
| 2025/0246007 | A1* | 7/2025 | Hemphill ................ | G06T 17/00 |

FOREIGN PATENT DOCUMENTS

| | | | | |
|---|---|---|---|---|
| CN | 117437637 A | 1/2024 | | |
| CN | 118518666 A | 8/2024 | | |
| WO | WO-2011054822 A1 * | 5/2011 | ............. | G01N 21/87 |
| WO | WO-2022183813 A1 * | 9/2022 | ............ | H04W 64/00 |

* cited by examiner

| Different Clarity Grade of Reference Image | Methodology Accuracy | Reference Image Example |
|---|---|---|
| VVS1 | 98.64% | |
| VVS2 | 99.11% | |
| VS1 | 99.73% | |
| VS2 | 99.65% | |
| SI1 | 98.53% | |
| SI2 | 98.78% | |

Figure 7

SYSTEM AND METHOD FOR GEMSTONE IDENTIFICATION

FIELD OF THE INVENTION

The present invention relates to systems and methods for gemstone identification.

BACKGROUND OF THE INVENTION

Gemstone are often targets for fraud and counterfeits. Successful counterfeits can cause significant monetary loss to consumers and businesses alike. Having a reliable authentication system for gemstone are highly desirable to commercial operations.

Currently, gemstone authentication is often done by trained gemologists who use specialized equipment such as microscopes to perform intricate inspection of the gemstones. However, this process can be time-consuming, expensive, and not readily available, especially in storefront environment. As a result, there is a need for a portable and efficient method of gemstone authentication that can be easily used by non-experts and deployable in store locations which may not have constant internet connection.

In the context of the present invention, an edge device is a device that can have both the capability to process data locally as well as cloud connectivity. Edge devices are designed to be more efficient and offer real-time processing capabilities, even when there is limited connectivity to the cloud. The edge capability of the gemstone authentication system allows it to locally process streaming video data, reducing the need for high bandwidth and cloud computing capabilities. Making the system ideal for use in storefronts and other locations where consistent cloud connectivity may not be available.

Cut gemstones possess a unique combination of physical characteristics which can be used for identification. Traditional methods include inspection by gemologists to detect changes in the gemstone's size, table facets, angles, inclusions, and other physical properties such as man-made markings, commonly performed using laser inscription.

Often, the most accessible area of a gemstone in a jewelry item is through the gemstone's crown, the top of the gemstone in layman's terms. Gemstones are usually attached to the holder or prongs of a jewelry item with the tip down to present the most eye-catching view of the gemstone, the crown view. While other areas, such as girdle and pavilion are obscured by the holder or prong. The crown is often selected to be presented for viewing in jewelry items, as the crown includes the table, the largest flat facet of the gemstone, where most light enters the gemstone and also gets reflected out of. Therefore, the crown view is the most accessible, where abundant gemstone physical characteristics are available for view.

Given unique physical characteristics each gemstone possesses, along with the recent advances in computer vision and machine learning technologies, it has become possible to authenticate gemstones through image matching. Image matching involves comparing the unique features of a gemstone captured in an image to a database of known authentic gemstones to determine its authenticity. Image matching is also expandable to matching streaming videos against images, as routinely demonstrated by facial identification systems.

U.S. Pat. No. 11,037,282 B2 demonstrates the use of machine learning algorithms in clarity characteristics and inclusions identification. Especially of note is the ability of the machine learning algorithms to extract useful information in the form of edges. The present invention takes reference of the capabilities of machine learning algorithms in extracting edges as features, and their ability to be robust to variations in data without reduction in performance, in order to apply it in terms of gemstone authentication.

U.S. Pat. No. 11,232,553 B2 further demonstrates the use of a jewelry security analysis system, method and computer program product allowing users to authenticate jewelry items through scanning at least the girdle of the gemstone. The present invention extends on the idea of capturing a section of the gemstone to identify unique characteristics, wherein the present invention only requires the unique markings, such as certificate numbers and brand labels, and surrounding area to be captured.

SUMMARY OF THE INVENTION

This invention provides a computer implemented method to match gemstones with records in a gemstone database. In one embodiment, said computer implemented method comprises the steps of: a) Acquiring a source image of a gemstone in question; b) Receiving an input for identifying a corresponding gemstone in said gemstone database; c) Retrieving a set of reference data related to said corresponding gemstone; d) Extracting gemstone features from said source image, said gemstone features comprise of inclusion mask, edge features and landmark; e) Performing alignment of said gemstone features with said set of reference data and performing a homography transformation to map said gemstone features onto a standard plane to obtain a transformed source image; f) Obtaining a transformed reference image from said set of reference data; g) Computing a similarity value by matching said transformed source image against said transformed reference image; and h) Determining whether said gemstone in question matches said corresponding gemstone based on said similarity value.

This invention further provides a non-transitory computer-readable storage medium comprising instructions stored therein which, when executed by one or more processors, cause the one or more processors to perform operations comprising the method of this invention.

This invention also provides a system to match gemstones with records in a gemstone database, using the computer implemented method of this invention. In one embodiment, said system comprises: a) one or more devices adapted to obtain a source image, each of said one or more devices comprising: i) a first processor; ii) an interface for receiving said input of step (b); iii) a first communication module; iv) a memory unit having executable instructions stored thereon, which, when executed, cause the first processor to transmit said input of step (b) for further execution of step (c) of said computer implemented method via said first communication module; b) a server comprising a second processor, said gemstone database, a second communication module and a memory unit having executable instructions stored thereon, which, when executed, cause the second processor to execute steps (c) to (h) of said computer implemented method; wherein said input is transmitted from the first communication module to the second communication module for execution of step (c); results of said step (h) is transmitted from the second communication module to the first communication module.

BRIEF DESCRIPTION OF THE FIGURES

Embodiments of the present disclosure are described by way of annotation with reference to drawings denoting system schematic and modules. Further embodiment is described by user operation flow diagram and user interfaces wireframes.

FIG. 7 illustrates the performance of the proposed methodology across different clarity grades of reference images. The table presents the methodology's accuracy for each clarity grade, including VVS1, VVS2, VS1, VS2, SI1, and SI2. The corresponding reference image examples are also shown alongside the accuracy values, demonstrating the system's ability to maintain high accuracy across varying gemstone clarity grades.

DETAILED DESCRIPTION OF THE INVENTION

Figure 1:
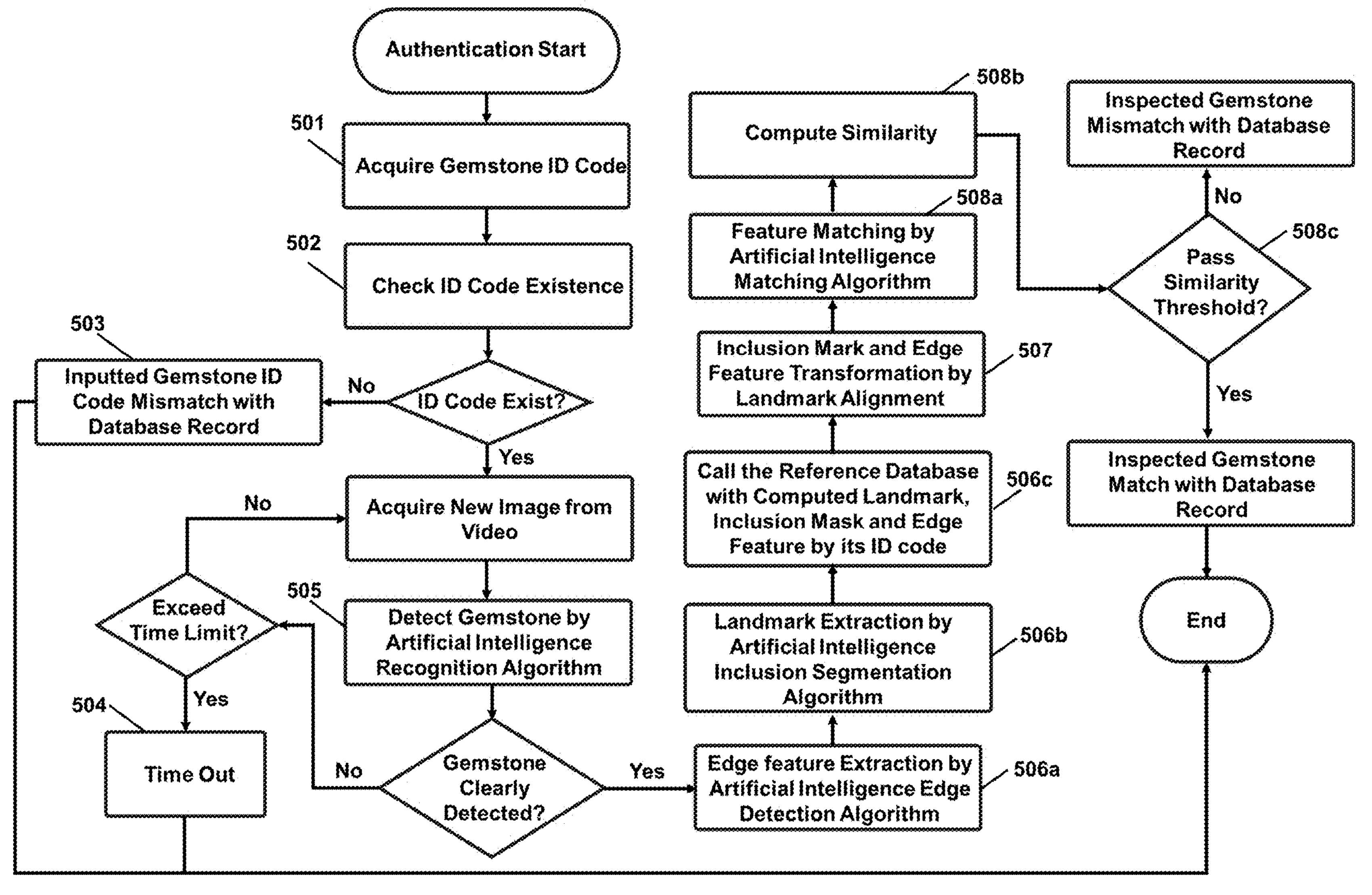
FIG. 1 is a flowchart of the authentication methodology, wherein the process begins once the user initiates the authentication process. The flowchart depicts the sequence of steps involved in gemstone identification, including image acquisition, feature extraction, database matching, and final authentication results.

This invention provides a computer-implemented method for identifying a specific gemstone by utilizing inscribed or natural marking. In one embodiment, the method comprises the following steps: (a) acquiring a gemstone identification code and verifying its existence in a database; (b) detecting the gemstone in a newly captured image; (c) extracting key features from the image, including edge features and inclusion markings, using the inscribed, polished or natural marking as a reference point; (d) retrieving one or more reference images of potential gemstone matches from a gemstone database based on the extracted features; (e) computing a similarity value by comparing the features of the source image with those of the reference images; and (f) identifying the specific gemstone from the reference images based on the computed similarity value.

This invention also provides a non-transitory computer-readable storage medium comprising instructions stored therein which, when executed by one or more processors, cause the one or more processors to perform operations comprising the computer implemented method of this invention.

This invention further provides a system to identify a specific gemstone using the computer implemented method of this invention. In one embodiment, said system comprises: (a) one or more devices adapted to obtain a source image, each of said one or more devices comprising: (i) a first processor; (ii) a memory unit having executable instructions stored thereon, which, when executed, cause the first processor to execute step (a) of said computer implemented method; (iii) a first communication module; (b) a server comprising a second processor, said gemstone database, a second communication module and a memory unit having executable instructions stored thereon, which, when executed, cause the second processor to execute steps (b) to (e) of said computer implemented method; wherein said inscribed or natural marking is detected and transmitted from the first communication module to the second communication module; said specific gemstone is identified and transmitted from the second communication module to the first communication module.

This invention provides a computer implemented method to match gemstones with records in a gemstone database. In one embodiment, said computer implemented method comprises the steps of: a) Acquiring a source image of a gemstone in question; b) Receiving an input for identifying a corresponding gemstone in said gemstone database; c) Retrieving a set of reference data related to said corresponding gemstone; d) Extracting gemstone features from said source image, said gemstone features comprise of inclusion mask, edge features and landmark; e) Performing alignment of said gemstone features with said set of reference data and performing a homography transformation to map said gemstone features onto a standard plane to obtain a transformed source image; f) Obtaining a transformed reference image from said set of reference data; g) Computing a similarity value by matching said transformed source image against said transformed reference image; and h) Determining whether said gemstone in question matches said corresponding gemstone based on said similarity value.

In one embodiment, said homography transformation comprises using said landmark as reference point for mapping said inclusion mask and edge features.

In one embodiment, said reference data comprises reference image.

In one embodiment, said source image is a still image from a camera or images processed from a streaming video.

In one embodiment, one or more of said steps (d), (e) or (f) are conducted with an artificial intelligence algorithm.

In one embodiment, said artificial intelligence algorithm is trained using labelled images of markings and gemstones, along with augmentations.

In one embodiment, said source image and said set of reference data differ in one or more of the characteristics selected from the group consisting of captured angle, distortions, lighting conditions, image quality, and noise.

In one embodiment, one or more of said steps (d), (e), or (f) comprise filtering image noise.

In one embodiment, said system further comprises determining whether said source image contains a gemstone in question prior to implementing said step (b).

In one embodiment, said set of reference data comprises one or more reference images or transformed reference images.

In one embodiment, said edge features comprise facets or girdles.

In one embodiment, said inclusion mask comprises internal inclusions or surface blemishes.

In one embodiment, said landmark is an inscribed marking or a natural marking.

In one embodiment, said alignment of step (e) is performed based on said landmark.

In one embodiment, said source image is a top view of said gemstone in question.

This invention further provides a non-transitory computer-readable storage medium comprising instructions stored therein which, when executed by one or more processors, cause the one or more processors to perform operations comprising the method of this invention.

This invention also provides a system to match gemstones with records in a gemstone database, using the computer implemented method of this invention. In one embodiment, said system comprises: a) one or more devices adapted to obtain a source image, each of said one or more devices comprising: i) a first processor; ii) an interface for receiving said input of step (b); iii) a first communication module; iv) a memory unit having executable instructions stored thereon, which, when executed, cause the first processor to transmit said input of step (b) for further execution of step (c) of said computer implemented method via said first communication module; b) a server comprising a second processor, said gemstone database, a second communication module and a memory unit having executable instructions stored thereon, which, when executed, cause the second processor to execute steps (c) to (h) of said computer implemented method; wherein said input is transmitted from the first communication module to the second communication module for execution of step (c); results of said step (h) is transmitted from the second communication module to the first communication module.

The invention will be better understood by reference to the following examples, but those skilled in the art will readily appreciate that the specific examples detailed are only illustrative, and are not meant to limit the invention as described herein, which is defined by the claims which follow thereafter. Throughout this application, various references or publications are cited. Disclosures of these references or publications in their entireties are hereby incorporated by reference into this application in order to more fully describe the state of the art to which this invention pertains. It is to be noted that the transitional term "comprising", which is synonymous with "including", "containing" or "characterized by", is inclusive or open-ended and does not exclude additional, un-recited elements or method steps.

The present invention is directed towards addressing the need for a gemstone authentication system that is portable, easy-to-use with edge capability. Regarding the authentication capability, more specifically, the system can capture and process streaming video of a gemstone, automatically detects gemstone physical characteristics and markings, such as inscribed information and certificate number, perform authentication through video to image matching technology and displaying the result. Regarding ease of use, the system can be transportable by the average storefront assistant without assistance of tools, the authentication process is automatic. Regarding edge capability, the system can perform computation and storage requirements coming with video to image matching technology.

Figure 2:
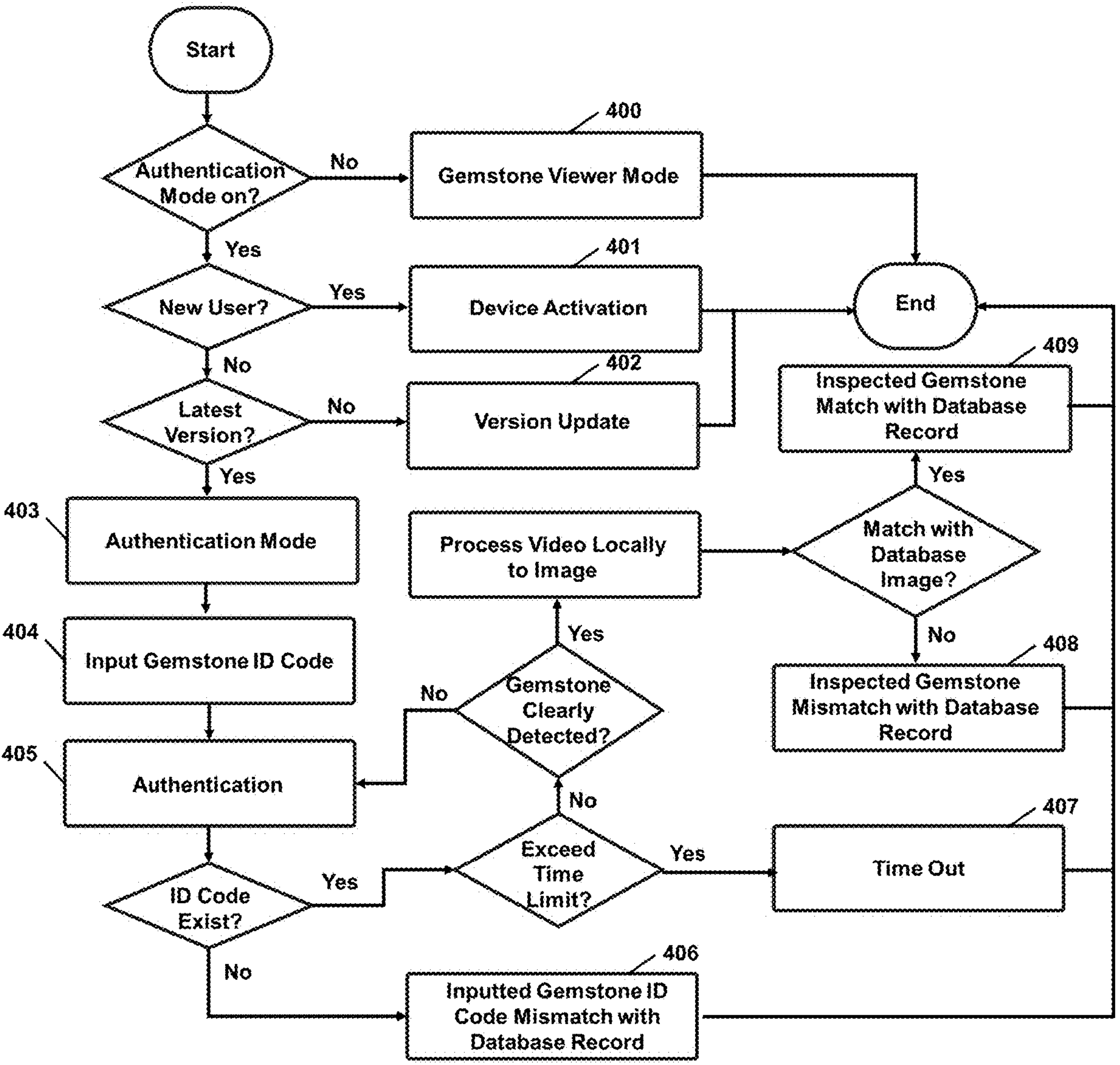
FIG. 2 is a user operation flow diagram that details the sequence of actions a user performs within the system. It includes decision points such as enabling authentication mode, activating the device, updating to the latest version, processing images from video, and matching the gemstone ID code with the cloud database for authentication.
Figure 3:
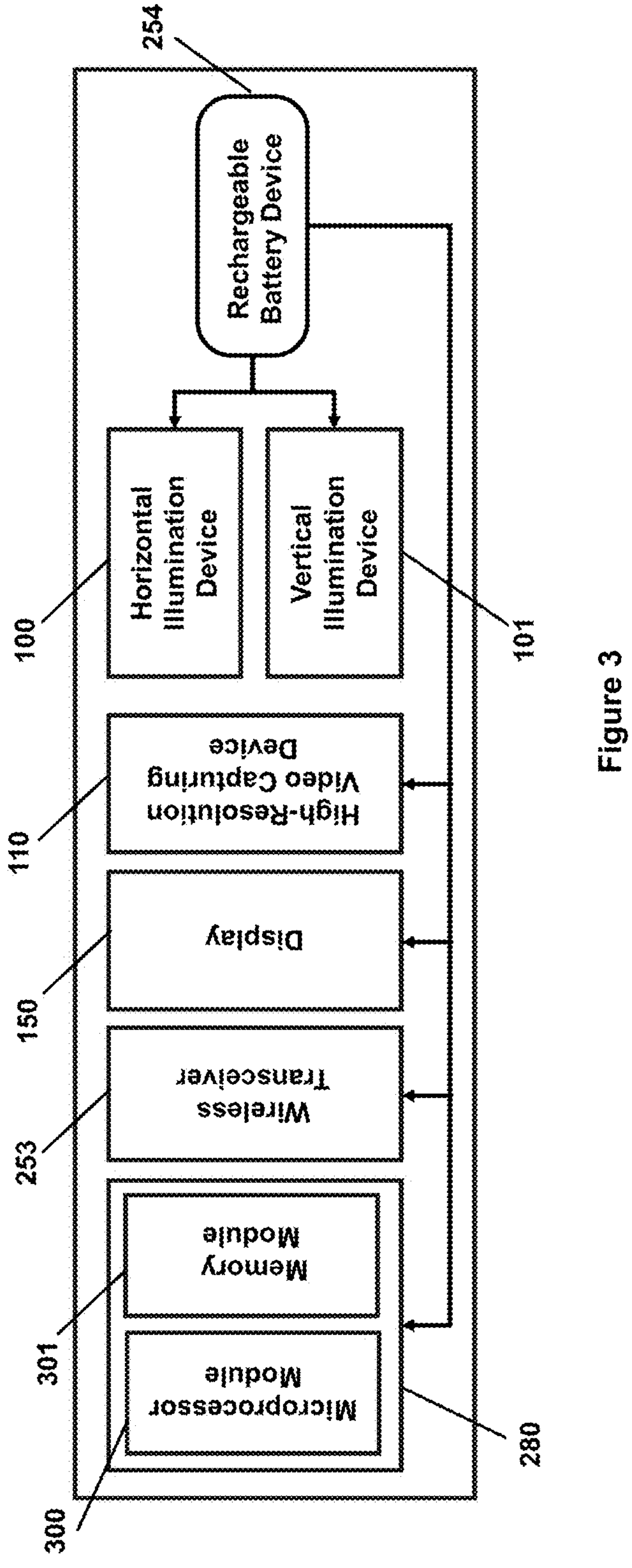
FIG. 3 is a depiction of the modules in the hardware housing of the system, as well as the denoting modules' power connectivity to the rechargeable battery device.

FIG. 1 provides the description of the flow of the authentication methodology; FIG. 2 depicts the overall user operation flow of the authentication system. FIG. 3 denotes the edge capable device components in order to capture the features of the gemstone for authentication purpose.

The present invention provides an automatic in-motion object recognition system and method for gemstone authentication, designed to perform real-time analysis under various conditions. Referring to FIG. 1, the process begins by capturing a streaming video of the inspected gemstone using a high-resolution video capturing device with its ID code input in 501. This could be either a loose gemstone or a gemstone mounted on a jewelry item. A frame from the video is sampled, referred to as the Inspected Image. In 502, the system checks the existence of the gemstone identification code, which is manually input by the operator in machine-readable text form. This input allows the system to retrieve the corresponding reference set of images from the gemstone database for authentication. If the ID code does not exist, the system identifies a mismatch with the database record in 503. If the ID code exists, the system proceeds by acquiring a new image from the video.

Referring to FIG. 2, the User Flowchart outlines the user interaction with the gemstone authentication system. The process begins with the user determining whether to activate the Authentication Mode, as indicated in 403. If Authentication Mode is not enabled, the system operates in Gemstone Viewer Mode, as shown in 400. If the user is new or if the system requires an update, the flow directs the user to either complete the Device Activation for new users in 401 or proceed with a Version Update in 402 to ensure the system is up to date. After these steps are completed, the user may continue with the authentication process. Once the user enters Authentication Mode in 403, they are prompted to manually input the gemstone ID code into the system in 404. Once the gemstone ID is received, the system initiates the authentication process in 405. The system first attempts to authenticate the gemstone based on the input ID code. If the ID code exists in the database, the process continues; however, if the ID code does not exist, the system identifies an Inputted Gemstone ID Code Mismatch with the Database Record in 406.

If the ID code is valid, the system processes the locally captured video to generate an image of the gemstone. Referring to FIG. 1, after acquiring the necessary video frames, the system proceeds to check whether the gemstone is clearly detected. Referring to 505, the system utilizes an Artificial Intelligence Recognition Algorithm to determine whether the gemstone has been clearly identified in the image. If the gemstone is not clearly detected, the process checks in 504 whether the time limit for detection has been exceeded. If the time limit is exceeded, the system terminates the authentication attempt due to a timeout, as indicated in 407. If the time limit has not been exceeded, the system continues analyzing the video until a clear detection of the gemstone is achieved.

Once the gemstone is clearly detected, the system processes the video and compares the generated Inspected Image with the reference image stored in the cloud database, as outlined in 408. Referring to **506*a***, the system applies the Artificial Intelligence Edge Detection Algorithm to perform Edge Feature Extraction on the inspected gemstone. This process extracts key structural features, such as facets and girdles, from the gemstone image. These extracted edge features are essential for ensuring the gemstone's structural details are captured for further comparison.

In **506*b*, the system applies the Artificial Intelligence Inclusion Segmentation Algorithm to identify and isolate internal or surface inclusions in the gemstone. The inclusion features, combined with the edge features extracted in 506***a*, represent the overall structural and natural aspects of the gemstone. These features are critical for accurate comparison, as the inclusions are often unique to the gemstone and provide additional distinguishing characteristics.

In 506*c*, the system applies the Artificial Intelligence Landmark Detection Algorithm to extract key reference points, or landmarks, from the gemstone. The landmarks ensure that both the edge and inclusion features are properly aligned with the reference images, allowing for an accurate comparison. This alignment eliminates distortions caused by varying angles or perspectives during image capture, which is necessary for the subsequent transformation of the features.

Figure 4:
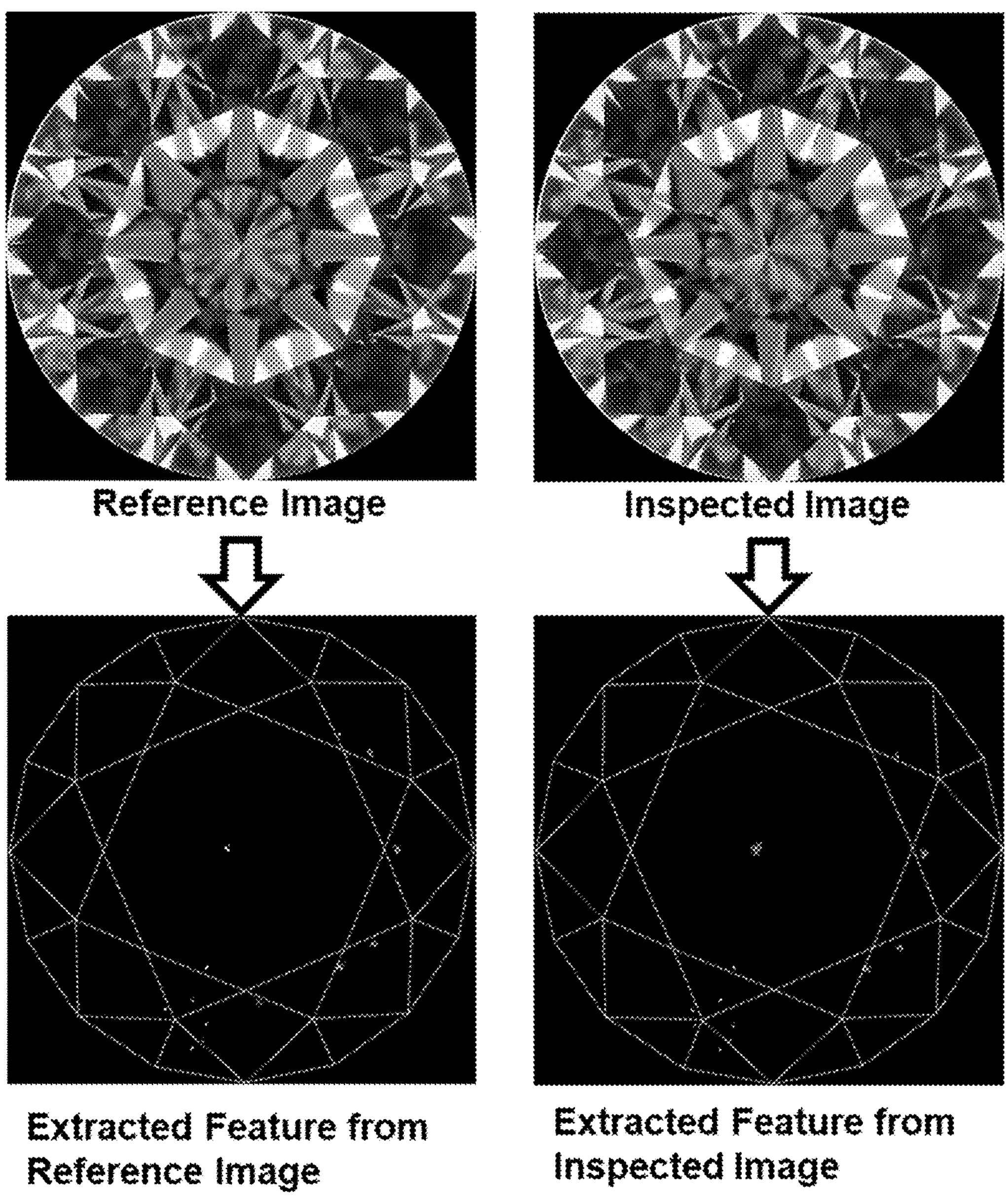
FIG. 4 illustrates the process of matching the extracted features from a reference image and an inspected gemstone image using an Artificial Intelligence (AI) Edge Detection Algorithm. The figure demonstrates the comparison between the extracted features from the inspected image and the reference image, showcasing the alignment and successful authentication between the two images through the AI Matching Algorithm.
Figure 5:
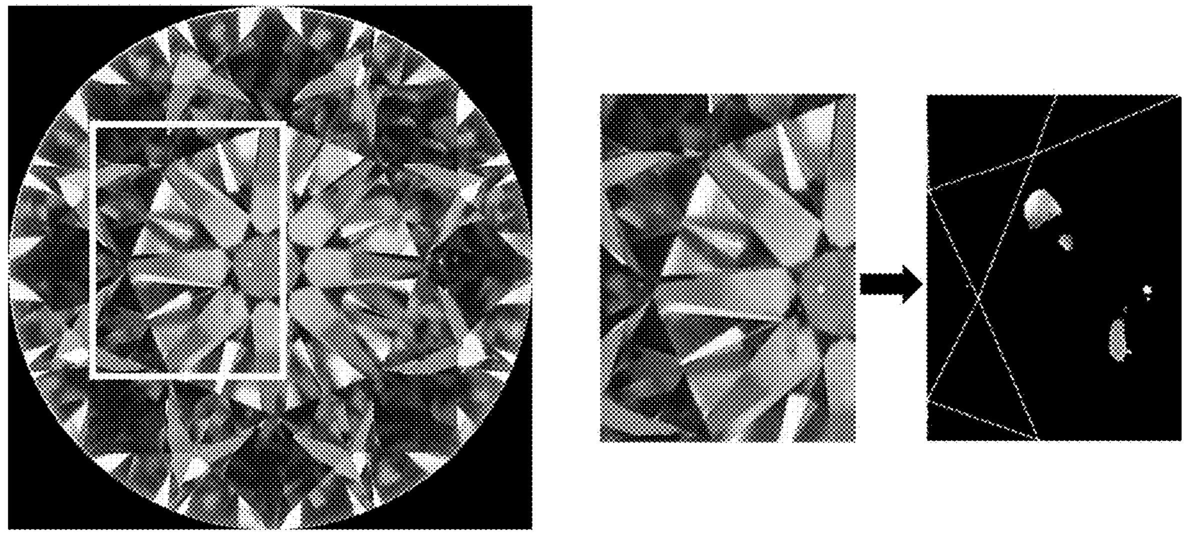
FIG. 5 highlights the ability of the algorithm to extract the edges of the gemstone where slight variations in the facet edges can be observed due to polishing. The figure further depicts the ability of the algorithm to extract edges of the inclusions.
Figure 6:
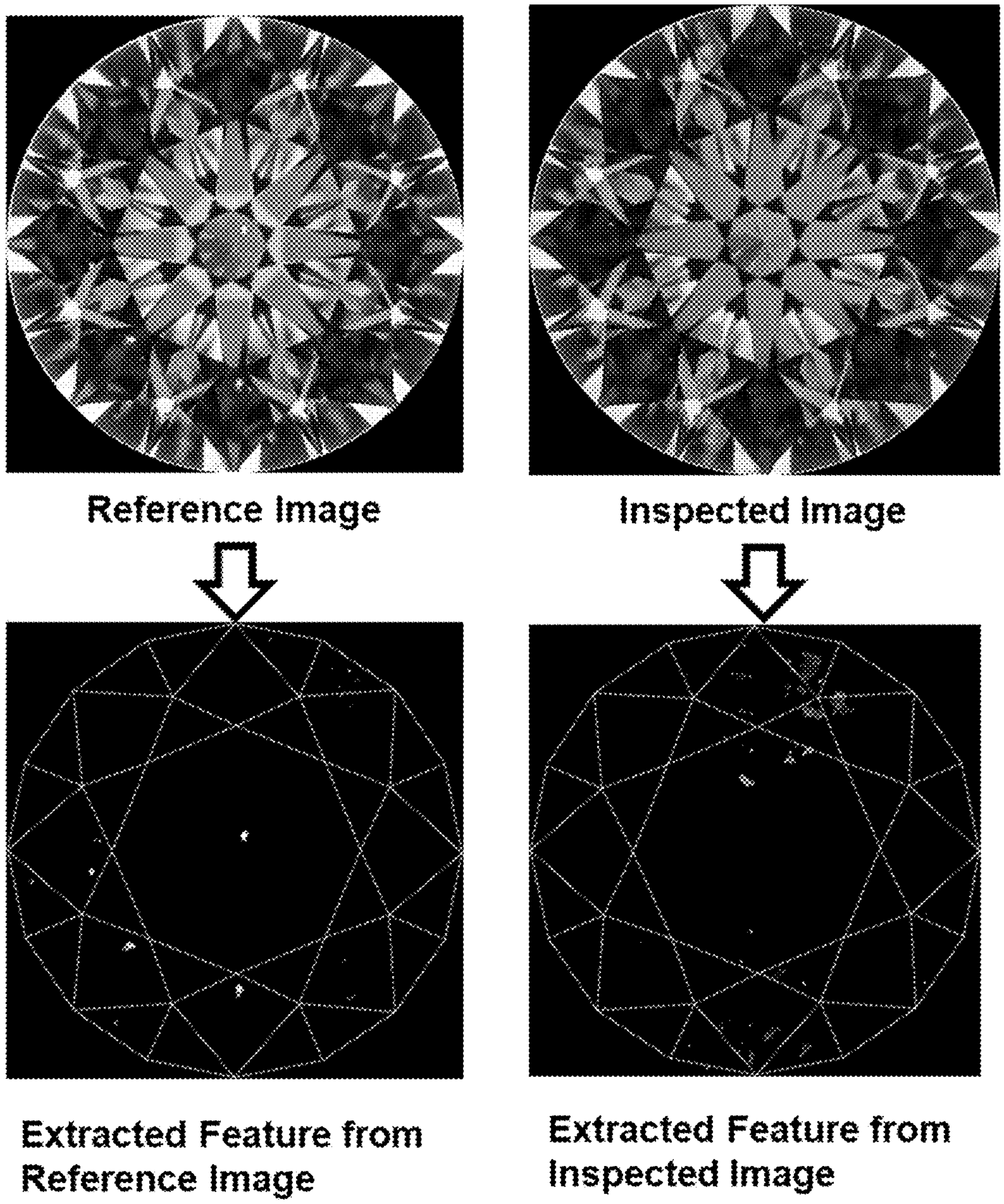
FIG. 6 depicts the detection of a mismatch between the inspected gemstone image and the reference image from the database. The figure demonstrates the extracted features from both the reference image and the inspected image using an Artificial Intelligence (AI) Edge Detection Algorithm, indicating a mismatch in the extracted features between the two images.

After aligning the gemstone's features, in 507, the system performs Inclusion Mask and Edge Feature Transformation by Landmark Alignment using a homography transformation. This transformation maps the inclusion mask and edge features into a standard plane using facet landmarks as reference points. Landmarks on the gemstones are defined as key facet junctions and characteristic features of edges unique to the gemstone. The system calculates a homography matrix that defines the precise mapping required to align these features detected on a gemstone against the corresponding reference. This process involves solving transformation parameters that minimize discrepancies in terms of distances between the corresponding landmarks of the inspected gemstone and the reference gemstone. By transforming the features into this standardized plane, the system ensures that the edge features are precisely aligned with those of the reference gemstone. This alignment compensates for variations in scale, rotation, and perspective that may occur due to different viewing angles or imaging conditions. The homography transformation effectively normalizes the gemstone's features, allowing for an accurate and direct comparison during the matching process. Referring to FIG. 4 and FIG. 6, after this transformation, the system displays the combined edge features for both the reference gemstone and the inspected gemstone. These figures illustrate how the features are overlaid in the standardized plane, highlighting the alignment achieved through the homography transformation. Via transformation, any differences detected between the detected gemstone picture and corresponding reference pictures are ensured to be discrepancies between the gemstones rather than artifacts of misalignment or distortion.

The transformed inclusion and edge features are then subjected to Feature Matching in 508*a*. The system uses an Artificial Intelligence Matching Algorithm to compare the inclusion and edge features of the inspected gemstone against the reference data. The matching process analyzes the similarities between the combined features of the inspected and reference gemstones. As shown in FIG. 4, closely aligned features indicate a strong similarity, while FIG. 6 highlights mismatched features, suggesting significant differences between the gemstones.

After the matching process, the system computes a Similarity Score in 508*b*. This score quantifies the degree of similarity between the inspected gemstone and the reference images, based on the transformed edge and inclusion features. A higher score suggests a strong match, while a lower score indicates a mismatch. FIG. 4 represents a higher similarity score due to the well-aligned features, while FIG. 6 shows a lower similarity score due to the misalignment of the features.

In 508*c*, the system checks if the computed Similarity Score meets the pre-defined threshold. If the score meets or exceeds the threshold, the gemstone is authenticated as a match with the database record, as shown in 409. If the score falls below the threshold, as in the case of FIG. 6, the system determines that the gemstone does not match the database record, resulting in a failed authentication. This threshold can be adjusted by the operator to meet specific security requirements, depending on the tolerance for potential counterfeiting.

The system's performance was validated through extensive testing. TABLE 1 is a table presenting the performance of the proposed methodology, tested with real diamond sample pairs. The table compares the results between the proposed methodology and a version of the methodology without landmark extraction and image rectification. The comparison includes the predicted positives, predicted negatives, and the resulting accuracy, demonstrating the significant improvement in accuracy when using the full proposed methodology. Referring to TABLE 1, the methodology was tested with real diamond sample pairs, achieving a 99.45% accuracy with 398 predicted positives and 2 predicted negatives. This demonstrates the system's effectiveness in distinguishing between gemstones. In contrast, when the key steps of Landmark Extraction and Image Rectification were omitted, the system's accuracy dropped to 0%, confirming the critical role of these processes in ensuring high accuracy.

TABLE 1

Performance Evaluation of the Methodology Using 100 Pairs of Real Diamond Samples

| | Proposed Methodology Without Incorporating Shooting Angles | Proposed Methodology Incorporating Four Distinct Shooting Angles | Proposed Methodology Excluding Landmark Extraction and Image Rectification |
|---|---|---|---|
| Predicted Positive | 100 | 398 | 0 |
| Predicted Negative | 0 | 2 | 400 |
| Accuracy | 100% | 99.5% | 0% |

TABLE 2 is a table showing the performance of the proposed methodology when searching for the real diamond sample from a dataset of reference images. The table displays the number of true positives, true negatives, predicted positives, and predicted negatives. The methodology demonstrates successful matching of inspected images with the correct reference images, with no false negatives and only a small number of false positives. Additionally, large-scale testing, as shown in TABLE 2, involved 8,330 gemstone samples, resulting in 4 true positives, 2 true negatives, and 0 false negatives, further validating the system's capability in accurately differentiating real diamonds.

TABLE 2

Performance Evaluation of the Methodology in Identifying a Real Diamond Sample Among 2,060 Fake Diamond Samples

| Class | Proposed Methodology Without Incorporating Shooting Angles | Proposed Methodology Incorporating Four Distinct Shooting Angles |
|---|---|---|
| Predicted Positive | 1 | 6 |
| Predicted Negative | 2059 | 8234 |
| Accuracy | 100% | 99.98% |

Furthermore, the system demonstrated its effectiveness across different clarity grades. As shown in FIG. 7, the system consistently achieved high accuracy across various clarity grades, including VVS1 at 98.64%, VVS2 at 99.11%, VS1 at 99.73%, VS2 at 99.65%, SI1 at 98.53%, and SI2 at 98.78%. These results underscore the robustness of the system in handling gemstones with varying levels of inclusions. The reference image examples in FIG. 7 illustrate the system's capability in accurately identifying and matching diamonds of different clarity grades.

The present invention also pertains to a system to enable the authentication methodology presented. FIG. 3 depicts the modules inside the hardware housing of the system. The gemstone authentication system includes a high-resolution digital video capturing device 110. The video capturing device's horizontal position is adjustable to find the correct distance to the gemstone to achieve a better focus for the streaming video. To allow for easier inspection, the streaming digital video can be digitally zoomed in and out. The hardware housing 190 consists of a processor unit 280, wireless transceiver module 253, powered by rechargeable battery device 254 also placed in the housing. Horizontal and Vertical illumination devices are integrated to provide optimal lighting conditions for capturing video of the gemstone, the horizontal illumination device provides 100 illuminations for backlighting, the vertical illumination device 101 is supported by flexible cable fittings, allowing the device to be adjusted vertically and rotationally to provide illumination at different heights and angles. The adjustable table is for the placement and capturing video of the gemstone and gemstones on jewelry. The inspected item is placed on a soft holder in adjustable table, it can be operated by changing the height and orientation to allow for different point-of-views (POV) of the gemstone under authentication.

The following sections are continued with reference to FIG. 2 and FIG. 3. To operate the system, the user will start up the system with the power switch. The system will start in Gemstone Viewer Mode 401. The user can then opt to enter Authentication Mode 403 through a button switch.

As mentioned, upon switching to Authentication Mode 403, user verification and software version check will first be performed. Considering the case of a new user, the following procedure is required to be performed by the user for activating the system. The new user will be directed to the Device Activation 400. In Device Activation 400, a QR code is present for the user to scan in the Device Activation User Interface, where the user's identity will be verified through an external verification system. Once verified, the device will be activated for use by adding a unique identification number to the database and the user can proceed to the next steps. In the case of verified user and activated system, the Device Activation 400 is skipped, and the system will directly go forward to the next step, Version Update 402.

Version Update 402 is an automatic process. The Wireless Transceiver module 253 will first transmit the system's software version to the cloud. The cloud server will then execute a script to determine if the version of the software is the most up to date. Considering the case of not up-to-date software, upon determination that the software on the local system is not up to date, the newest version of the software will be received through Wireless Transceiver 253. The update will then be installed on the system automatically. In the case of up-to-date software already present or that there is no internet connection, no new software will be received and installed.

Proceeding from Version Update 402, the system's processor unit 280 in the hardware housing 190, consisting of a processor module 300 and memory module 301, works collaboratively to automatically process the streaming video captured by the high-resolution digital video capturing device 110. The processing unit 280 will, in real-time, execute the gemstone physical characteristics and certificate number inscription detection process loop 404. The user will adjust the point-of-view of the gemstone and the laser inscription by manipulating the adjustable table and focus adjustment knob. The user can also adjust the magnification of the streaming video on display 150 to their convenience.

Once the gemstone physical characteristics and certificate number inscription are detected, the processed video can either be sent to the cloud or to the local processor unit 280 for video-to-image matching. If the processed video is to be sent to the cloud, the transmitted data will be encrypted on transmission, and decrypted on the cloud server side. As described process 404, an automatic time limit test will be performed in the loop, in the case where the gemstone and certification number inscription are not detected, the system will proceed to the 'time out' 407, and the display 150 will show the time out user interface. If the user wishes, the authentication procedure may be restarted by pressing the 'Start' button shown in the UI on display 150.

If the gemstone and the unique markings are detected and recognized using the Artificial Intelligence Detection and Recognition aforementioned, the processed video is sent to the cloud through the wireless transceiver module 253, the cloud server will perform automatic video-to-image matching process 106 against a cloud database with stored images of gemstones, undergoing the methodology described in the present invention.

For the intention of the video-to-image process 408, the cloud database on the cloud server contains sets of encrypted images of gemstones, where each set belongs to a specific certified gemstone. Wherein each set of images of the gemstones can be one or many pictures. The set of images contains at least one image, depicting the unique identification markings or features or both, of the gemstones for recognition purposes.

If the gemstone is determined to be genuine 406 by matching with a gemstone imagery record in the database, the display module 150 is brought to an "Authentication Passed" page, confirming the gemstone's authenticity. If the gemstone is found to be counterfeit or unable to match with any gemstones recorded in the database 405, the display is brought to an "Authentication Failed", indicating that the gemstone does not match with database records, thus completing the automatic authentication procedure. The automatic authentication procedure is important to the functionality of the system as it increases the system's ease of use and reduces the training needed for operation by workers without gemologist training, further reducing the testing duration and human error involved in the gemstone authentication process. One such deployment scenario is at the jewelry storefront, operated by sales personnel.

In addition, the gemstone authentication system includes a battery module 254 for powering the system, which allows for portability and, along with the wireless transceiver module 253, eliminates the need for wired connections. The compact and portable design of the gemstone authentication system makes it easy to transport and deploy in storefronts.

As shown above, the system's capability to perform authentication with or without internet or intranet connectivity, automatic authentication process and portability, makes the system suitable to, but not limited to, deployment in storefronts or laboratory environments.

What is claimed is:

1. A computer implemented method to match gemstones with records in a gemstone database, comprising the steps of:

a. Acquiring a source image of a gemstone in question;
b. Receiving an input for identifying a corresponding gemstone in said gemstone database;
c. Retrieving a set of reference data related to said corresponding gemstone;
d. Extracting gemstone features from said source image, said gemstone features comprise of inclusion mask, edge features and landmark;
e. Performing alignment of said gemstone features with said set of reference data and performing a homography transformation to map said gemstone features onto a standard plane to obtain a transformed source image; said homography transformation comprises using said landmark as reference point for mapping said inclusion mask and edge features;
f. Obtaining a transformed reference image from said set of reference data;
g. Computing a similarity value by matching said transformed source image against said transformed reference image; and
h. Determining whether said gemstone in question matches said corresponding gemstone based on said similarity value.

2. The method of claim 1, wherein said reference data comprises reference image.

3. The method of claim 1, wherein said source image is a still image from a camera or images processed from a streaming video.

4. The method of claim 1, wherein one or more of said steps (d), (e) or (f) are conducted using artificial intelligence.

5. The method of claim 4, wherein said artificial intelligence is trained using labelled images of markings and gemstones, along with augmentations.

6. The method of claim 1, wherein said source image and said set of reference data differ in one or more of the characteristics selected from a group consisting of captured angle, distortions, lighting conditions, image quality, and noise.

7. The method of claim 1, wherein one or more of said steps (d), (e), or (f) comprise filtering image noise.

8. The method of claim 1, further comprises determining whether said source image contains a gemstone in question prior to implementing said step (b).

9. The method of claim 1, wherein said set of reference data comprises one or more reference images or transformed reference images.

10. The method of claim 1, wherein said edge features comprises facets or girdles.

11. The method of claim 1, wherein said inclusion mask comprises internal inclusions or surface blemishes.

12. The method of claim 1, wherein said landmark is an inscribed marking or a natural marking.

13. The method of claim 1, wherein said alignment of step (e) is performed based on said landmark.

14. The method of claim 1, wherein said source image is a top view of said gemstone in question.

15. A non-transitory computer-readable storage medium comprising instructions stored therein which, when executed by one or more processors, cause the one or more processors to perform operations comprising the method of claim 1.

16. A system to match gemstones with records in a gemstone database, using the computer implemented method of claim 1, comprising:

a. one or more devices adapted to obtain a source image, each of said one or more devices comprising:
   i. a first processor;
   ii. an interface for receiving said input of step (b)
   iii. a first communication module;
   iv. a memory unit having executable instructions stored thereon, which, when executed, cause the first processor to transmit said input of step (b) for further execution of step (c) of said computer implemented method via said first communication module;
b. a server comprising a second processor, said gemstone database, a second communication module and a memory unit having executable instructions stored thereon, which, when executed, cause the second processor to execute steps (c) to (h) of said computer implemented method;

wherein said input is transmitted from the first communication module to the second communication module for execution of step (c);

results of said step (h) is transmitted from the second communication module to the first communication module.

* * * * *